US008132623B2

(12) United States Patent
Allin et al.

(10) Patent No.: US 8,132,623 B2
(45) Date of Patent: Mar. 13, 2012

(54) METHODS OF USING LOST CIRCULATION COMPOSITIONS

(75) Inventors: Melissa G Allin, Comanche, OK (US); John L. Dennis, Jr., Marlow, OK (US); Donald L. Whitfill, Kingwood, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 298 days.

(21) Appl. No.: 11/337,707

(22) Filed: Jan. 23, 2006

(65) Prior Publication Data

US 2007/0169937 A1    Jul. 26, 2007

(51) Int. Cl.
*E21B 33/13* (2006.01)
*E21B 7/00* (2006.01)
(52) U.S. Cl. .......................... 166/300; 166/292; 175/72
(58) Field of Classification Search .................. None
See application file for complete search history.

(56) References Cited

U.S. PATENT DOCUMENTS

| | | | |
|---|---|---|---|
| 2,274,297 A | 2/1942 | Irons et al. | |
| 2,650,195 A * | 8/1953 | Cardwell et al. | 166/295 |
| 2,815,079 A * | 12/1957 | Goins, Jr. et al. | 166/294 |
| 3,208,524 A | 9/1965 | Homer et al. | |
| 3,490,535 A | 1/1970 | Messenger | |
| 3,749,173 A | 7/1973 | Hill et al. | |
| 3,929,191 A * | 12/1975 | Graham et al. | 166/276 |
| 4,042,032 A | 8/1977 | Anderson et al. | |
| 4,070,865 A | 1/1978 | McLaughlin | |
| 4,158,388 A | 6/1979 | Owen et al. | |
| 4,175,619 A | 11/1979 | Davis | |
| 4,190,112 A | 2/1980 | Davis | |
| 4,304,300 A | 12/1981 | Watson | |
| 4,423,781 A | 1/1984 | Thomas | |
| 4,428,427 A | 1/1984 | Friedman | |
| 4,439,328 A | 3/1984 | Moity | |
| 4,474,240 A | 10/1984 | Oliver, Jr. et al. | |
| 4,530,402 A | 7/1985 | Smith et al. | |
| 4,627,496 A | 12/1986 | Ashford et al. | |
| 4,674,573 A | 6/1987 | Bode | |
| 4,683,949 A | 8/1987 | Sydansk et al. | |
| 4,706,747 A | 11/1987 | Schneider | |
| 4,756,365 A | 7/1988 | Schneider | |
| 4,829,100 A | 5/1989 | Murphey et al. | |
| 4,875,525 A * | 10/1989 | Mana | 166/280.2 |
| 4,957,166 A * | 9/1990 | Sydansk | 166/295 |
| 4,957,174 A | 9/1990 | Whitfill et al. | |
| 4,964,465 A | 10/1990 | Surles | |
| 5,058,676 A | 10/1991 | Fitzpatrick et al. | |
| 5,076,944 A | 12/1991 | Cowan et al. | |
| 5,101,902 A | 4/1992 | Parcevaux et al. | |
| 5,128,390 A | 7/1992 | Murphey et al. | |
| 5,159,980 A | 11/1992 | Onan et al. | |
| 5,180,020 A | 1/1993 | Fuh et al. | |
| 5,207,282 A | 5/1993 | Fuh et al. | |
| 5,232,961 A | 8/1993 | Murphey et al. | |
| 5,321,062 A | 6/1994 | Landrum et al. | |
| 5,322,124 A | 6/1994 | Cowan et al. | |
| 5,332,037 A * | 7/1994 | Schmidt et al. | 166/276 |
| 5,346,011 A | 9/1994 | Onan et al. | |
| 5,346,012 A | 9/1994 | Heathman et al. | |
| 5,437,330 A | 8/1995 | Gambertoglio | |
| 5,559,086 A | 9/1996 | Dewprashad et al. | |
| 5,588,488 A | 12/1996 | Vijn et al. | |
| 5,609,207 A | 3/1997 | Dewprashad et al. | |
| 5,697,440 A | 12/1997 | Weaver et al. | |
| 5,712,314 A | 1/1998 | Surles et al. | |
| 5,775,425 A | 7/1998 | Weaver et al. | |
| 5,782,300 A | 7/1998 | James et al. | |
| 5,787,986 A | 8/1998 | Weaver et al. | |
| 5,826,669 A | 10/1998 | Zaleski et al. | |
| 5,833,000 A | 11/1998 | Weaver et al. | |
| 5,836,392 A | 11/1998 | Urlwin-Smith | |
| 5,839,510 A | 11/1998 | Weaver et al. | |
| 5,849,674 A * | 12/1998 | Fox et al. | 507/140 |
| 5,853,048 A | 12/1998 | Weaver et al. | |
| 5,871,049 A | 2/1999 | Weaver et al. | |
| 5,873,413 A | 2/1999 | Chatterji et al. | |
| 5,875,844 A | 3/1999 | Chatterji et al. | |
| 5,875,845 A | 3/1999 | Chatterji et al. | |
| 5,875,846 A | 3/1999 | Chatterji et al. | |
| 5,911,282 A | 6/1999 | Onan et al. | |
| 5,913,364 A | 6/1999 | Sweatman | |

(Continued)

FOREIGN PATENT DOCUMENTS

FR    2863301    *    6/2005
WO    0224771 A2    3/2002

OTHER PUBLICATIONS

Halliburton brochure entitled "FlexPlug Service" dated 1998 (provided by applicant).* Material Safety Data Sheet, Claytone II, Southern Clay Products, A Subsidiary of Rockwood Specialties, Inc., Prepared by Quality Engineering Department, Southern Clay Products, Revision 3, Sep. 17, 2003 and retrieved Jun. 3, 2010 from http://www.southernclayproducts.com/nafta/msds_pdfs/ctll.pdf.*
Halliburton brochure entitled "Flexplug® OBM Lost-Circulation Material" dated 2005.
Halliburton brochure entitled "Flexplug® W Lost-Circulation Material" dated 2005.
Halliburton brochure entitled "Expedite® Service" dated 2005.
Halliburton brochure entitled "FlexPlug Service" dated 1998.
Halliburton brochure entitled "H2Zero™ Service" dated 2005.
Halliburton brochure entitled "SandWedge® NT Conductivity Enhancement System" dated 2004.
Halliburton brochure entitled "StrataLock™ Wellbore/Formation Stabilization System" dated 2003.
Dupriest, Fred, "Fracture Closure Stress (FCS) and lost Returns Practices" SPE/IADC 92192 dated 2005.
Aston, M.S. et al., "Drilling Fluids for Wellbore Strengthening" IADC/SPE 87130, dated 2004.
Alberty, Mark et al., "A Physical Model for Stress Cages" SPE 90493 dated 2004.

(Continued)

Primary Examiner — Angela M DiTrani
(74) Attorney, Agent, or Firm — Craig W. Roddy; Conley Rose, P.C.

(57) ABSTRACT

A method of servicing a wellbore in contact with a subterranean formation, comprising: placing a wellbore servicing fluid comprising a crosslinkable polymer system and a filler into a lost circulation zone within the wellbore. A method of blocking the flow of fluid through a lost circulation zone in a subterranean formation comprising placing a first composition comprising a packing agent into the lost circulation zone, placing a second composition comprising a crosslinkable polymer system and a filler into the lost circulation zone, and allowing the compositions to set into place.

35 Claims, 11 Drawing Sheets

U.S. PATENT DOCUMENTS

| | | | | |
|---|---|---|---|---|
| 5,957,204 | A | 9/1999 | Chatterji et al. | |
| 5,960,878 | A | 10/1999 | Nguyen et al. | |
| 5,969,006 | A | 10/1999 | Onan et al. | |
| 6,006,835 | A | 12/1999 | Onan et al. | |
| 6,006,836 | A | 12/1999 | Chatterji et al. | |
| 6,012,524 | A | 1/2000 | Chatterji et al. | |
| 6,036,765 | A * | 3/2000 | Farrow et al. | 106/487 |
| 6,047,772 | A | 4/2000 | Weaver et al. | |
| 6,059,035 | A | 5/2000 | Chatterji et al. | |
| 6,060,434 | A * | 5/2000 | Sweatman et al. | 507/216 |
| 6,068,055 | A | 5/2000 | Chatterji et al. | |
| 6,069,117 | A | 5/2000 | Onan et al. | |
| 6,098,711 | A | 8/2000 | Chatterji et al. | |
| 6,124,246 | A | 9/2000 | Heathman et al. | |
| 6,152,227 | A | 11/2000 | Lawson et al. | |
| 6,167,967 | B1 | 1/2001 | Sweatman | |
| 6,192,986 | B1 * | 2/2001 | Urlwin-Smith | 166/295 |
| 6,196,311 | B1 | 3/2001 | Treece | |
| 6,196,317 | B1 * | 3/2001 | Hardy | 166/295 |
| 6,209,643 | B1 | 4/2001 | Nguyen et al. | |
| 6,231,664 | B1 | 5/2001 | Chatterji et al. | |
| 6,234,251 | B1 | 5/2001 | Chatterji et al. | |
| 6,238,106 | B1 | 5/2001 | Rosati | |
| 6,244,344 | B1 | 6/2001 | Chatterji et al. | |
| 6,258,757 | B1 | 7/2001 | Sweatman et al. | |
| 6,271,181 | B1 | 8/2001 | Chatterji et al. | |
| 6,279,652 | B1 | 8/2001 | Chatterji et al. | |
| 6,311,773 | B1 | 11/2001 | Todd et al. | |
| 6,321,841 | B1 | 11/2001 | Eoff et al. | |
| 6,328,106 | B1 | 12/2001 | Griffith et al. | |
| 6,330,917 | B2 | 12/2001 | Chatterji et al. | |
| 6,350,309 | B2 | 2/2002 | Chatterji et al. | |
| 6,367,549 | B1 | 4/2002 | Chatterji et al. | |
| 6,378,363 | B1 | 4/2002 | Hache et al. | |
| 6,401,817 | B1 | 6/2002 | Griffith et al. | |
| 6,427,775 | B1 | 8/2002 | Dusterhoft et al. | |
| 6,446,722 | B2 | 9/2002 | Nguyen et al. | |
| 6,448,206 | B1 | 9/2002 | Griffith et al. | |
| 6,457,524 | B1 | 10/2002 | Roddy | |
| 6,503,870 | B2 | 1/2003 | Griffith et al. | |
| 6,508,306 | B1 | 1/2003 | Reddy et al. | |
| 6,523,612 | B2 | 2/2003 | Reynolds | |
| 6,555,507 | B2 | 4/2003 | Chatterji et al. | |
| 6,593,402 | B2 | 7/2003 | Chatterji et al. | |
| 6,595,289 | B2 | 7/2003 | Tumlin et al. | |
| 6,664,215 | B1 | 12/2003 | Tomlinson | |
| 6,668,926 | B2 | 12/2003 | Nguyen et al. | |
| 6,691,780 | B2 | 2/2004 | Nguyen et al. | |
| 6,703,351 | B2 | 3/2004 | Stowe, II et al. | |
| 6,705,400 | B1 | 3/2004 | Nguyen et al. | |
| 6,725,926 | B2 | 4/2004 | Nguyen et al. | |
| 6,725,931 | B2 | 4/2004 | Nguyen et al. | |
| 6,729,404 | B2 | 5/2004 | Nguyen et al. | |
| 6,732,800 | B2 | 5/2004 | Acock et al. | |
| 6,742,590 | B1 | 6/2004 | Nguyen | |
| 6,755,245 | B2 | 6/2004 | Nguyen et al. | |
| 6,762,156 | B2 | 7/2004 | Heathman et al. | |
| 6,776,236 | B1 | 8/2004 | Nguyen | |
| 6,838,417 | B2 | 1/2005 | Bouwmeester et al. | |
| 6,861,392 | B2 | 3/2005 | Shaarpour | |
| 6,866,099 | B2 | 3/2005 | Nguyen | |
| 6,875,729 | B2 | 4/2005 | Verlaan et al. | |
| 6,880,642 | B1 | 4/2005 | Garrett et al. | |
| 6,881,708 | B2 | 4/2005 | Reddy et al. | |
| 6,887,833 | B2 | 5/2005 | Brothers et al. | |
| 6,887,834 | B2 | 5/2005 | Nguyen et al. | |
| 6,889,768 | B2 * | 5/2005 | Girgenti | 166/294 |
| 6,889,780 | B2 | 5/2005 | Whitfill et al. | |
| 6,892,813 | B2 | 5/2005 | Nguyen et al. | |
| 6,920,929 | B2 | 7/2005 | Bour | |
| 6,936,574 | B2 | 8/2005 | Dao et al. | |
| 7,044,222 | B2 | 5/2006 | Tomlinson | |
| 7,066,285 | B2 | 6/2006 | Shaarpour | |
| 7,077,203 | B1 | 7/2006 | Roddy et al. | |
| 7,131,491 | B2 | 11/2006 | Blauch et al. | |
| 7,147,056 | B2 | 12/2006 | Brothers et al. | |
| 7,174,962 | B1 | 2/2007 | Roddy et al. | |
| 7,213,645 | B2 | 5/2007 | Sweatman et al. | |
| 7,297,662 | B2 * | 11/2007 | Verret | 507/107 |
| 7,351,681 | B2 | 4/2008 | Reddy et al. | |
| 7,559,370 | B2 | 7/2009 | Crabree et al. | |
| 7,669,653 | B2 | 3/2010 | Craster et al. | |
| 7,696,304 | B2 | 4/2010 | Kayser et al. | |
| 7,776,797 | B2 | 8/2010 | Allin et al. | |
| 2003/0008778 | A1 * | 1/2003 | Donaldson et al. | 507/100 |
| 2004/0132625 | A1 | 7/2004 | Halliday et al. | |
| 2004/0177964 | A1 * | 9/2004 | Girgenti | 166/294 |
| 2005/0059558 | A1 | 3/2005 | Blauch et al. | |
| 2005/0092489 | A1 | 5/2005 | Welton et al. | |
| 2005/0109506 | A1 | 5/2005 | Slabaugh et al. | |
| 2005/0124502 | A1 | 6/2005 | Shaarpour | |
| 2005/0277554 | A1 | 12/2005 | Blauch et al. | |
| 2006/0178275 | A1 | 8/2006 | Shaarpour | |
| 2006/0234871 | A1 * | 10/2006 | Dalrymple et al. | 507/211 |
| 2007/0125534 | A1 | 6/2007 | Reddy et al. | |
| 2007/0173412 | A1 | 7/2007 | Allin et al. | |

OTHER PUBLICATIONS

Sweatman, Ron et al., "Formation Pressure Integrity Treatments Optimize Drilling and Completion of HTHP Production Hole Sections" SPE 68946, dated 2001.

Fuh, Giin-Fa et al., "A New approach to preventing lost circulation while drilling", SPE 24599, dated 1992.

Hardy, Mary et al., "The first carbonate field application of a new organically crosslinked water shutoff polymer system", SPE 50738 dated 1999.

Whitfill, Donald et al., "Borehole stress treatments—An engineered approach to prevent lost circulation" undated.

Whitfill, Donald et al., "Managing Wellbore Pressure Containment" dated 2005.

"Introduction to the Mini MACS Analyzer" Section 1, pp. 1-1 to 1-6, dated Jun. 1997.

Hardy, Mary et al., "New organically crosslinked polymer system provides competent propagation at high temperature in conformance treatments" dated 1998.

Allin, Melissa et al., "Lost Circulation Product" filed Jan. 23, 2006 as U.S. Appl. No. 11/337,713.

Hydro-Plug™ Technical Information bulletin.

Baroid brochure entitled "Hydro-Plug™ Lost Circulation Plug" dated 2002.

Whitfill, Donald et al., "All Lost-Circulation Materials and Systems are Not Created Equal" dated 2003, SPE 84319.

Baroid brochure "Steelseal® Lost Circulation Materials" dated 2005.

Baroid brochure "Diamond Seal™ Absorbent Polymer for Lost Circulation" dated 2000.

Tare, Uday et al., "Drilling Fluid Losses and Gains: Case Histories and Practical Solutions" dated 2001, SPE 71368.

Darby, Ronald, Viscoelastic Fluids: An Introduction to Their Properties and Behavior, Chapter 1: Sections 1.1-1.6, 1976, pp. 1-12+cover, Marcel Dekker, Inc., New York.

Gere, James M., et al., Mechanics of Materials, Chapter I: Sections 1.1-1.8, 1997, 64 pgs.+cover, PWS Publishing Co., Boston, MA.

Halliburton brochure entitled "Flexplug® Service: Helps Operator Solve Lost Circulation Problems Quickly and Effectively", Cementing, 1 pg., 2004.

Halliburton brochure, "HZ-10: Polymer," Conformance Technology, 1 pg.

Halliburton brochure, "HZ-20: Crosslinker," Conformance Technology, 1 pg.

Halliburton brochure, "Steelseal® Fine: Lost Circulation Material," Baroid Fluid Services, Product Data Sheet, Sep. 5, 2006, 1 pg., Halliburton Fluid Systems.

Halliburton brochure, "Thermatek(SM) Service: Helps meet the challenges of severe lost circulation; near wellbore water shutoffs and plugging operations," Stimulation, 1 pg.

Halliburton brochure, "Wellbore Stress Management(SM) Service," Top Technology Solutions 2006, 1 pg.

Halliburton Press Release entitled "Halliburton Performs First H2Zero™ Conformance Solution Job in North America", dated 2001.

Steffe, James F., Rheological Methods in Food Process Engineering, Chapter 1: Sections 1.1-1.4, 1992, pp. 1-12+cover, Freeman Press.

Walters, Harold G., et al., "Kinetic Rheology of Hydraulic Fracturing Fluids,".SPE 71660, 2001, 12 pgs, Society of Petroleum Engineers, Inc.

Office Action dated May 17, 2007 for U.S. Appl. No. 11/531,579 (15 pages).

Allin, Melissa et al., "Method to Control the Physical Interface Between Two or More Fluids" filed Sep. 13, 2006 as U.S. Appl. No. 11/531,579.

Allin, Melissa et al., "Method to Control the Physical Interface Between Two or More Fluids," filed Apr. 30, 2007, as U.S. Appl. No. 11/742,430.

Foreign Communication from a related counterpart application—International Search Report and Written Opinion, PCT/GB2007/003434, Dec. 20, 2007, 19 pages.

Office Action (Final) dated Apr. 17, 2008 (19 pages), U.S. Appl. No. 11/742,430, filed Apr. 30, 2007.

Office Action dated Apr. 29, 2008 (16 pages), U.S. Appl. No. 11/531,579, filed Sep. 13, 2006.

Office Action dated Oct. 31, 2007 (46 pages), U.S. Appl. No. 11/531,579, filed Sep. 13, 2006.

Office Action dated Oct. 31, 2007 (48 pages), U.S. Appl. No. 11/742,430, filed Apr. 30, 2007.

Advisory Action dated Jun. 20, 2008 (3 pages), U.S. Appl. No. 11/742,430, filed Apr. 30, 2007.

Office Action dated Aug. 15, 2008 (19 pages), U.S. Appl. No. 11/742,430, filed Apr. 30, 2007.

Office Action (Final) dated Dec. 4, 2008 (19 pages), U.S. Appl. No. 11/531,579, filed Sep. 13, 2006.

Office Action dated Jan. 22, 2009 (41 pages), U.S. Appl. No. 11/337,713, filed Jan. 23, 2006.

Office Action dated Feb. 2, 2009 (12 pages), U.S. Appl. No. 11/742,430, filed Apr. 30, 2007.

Office Action dated May 20, 2009 (18 pages), U.S. Appl. No. 11/531,579, filed Sep. 13, 2006.

Office Action dated Jul. 23, 2009 (19 pages), U.S. Appl. No. 11/337,713, filed Jan. 23, 2006.

Office Action (Final) dated Nov. 17, 2009 (17 pages), U.S. Appl. No. 11/531,579, filed Sep. 13, 2006.

Office Action dated Dec. 9, 2009 (11 pages), U.S. Appl. No. 11/337,713, filed Jan. 23, 2006.

Advisory Action dated Feb. 27, 2009 (3 pages), U.S. Appl. No. 11/531,579, filed Sep. 13, 2006.

Notice of Allowance dated Mar. 22, 2010 (17 pages), U.S. Appl. No. 11/742,430, filed Apr. 30, 2007.

Notice of Allowance dated Jun. 28, 2010 (11 pages), U.S. Appl. No. 11/337,713, filed Jan. 23, 2006.

Office Action (Final) dated Jun. 10, 2010 (12 pages), U.S. Appl. No. 11/337,713, filed Jan. 23, 2006.

* cited by examiner

METHODS OF USING LOST CIRCULATION COMPOSITIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This disclosure relates to compositions for servicing a wellbore experiencing lost circulation. More specifically, this disclosure relates to introducing compositions into a wellbore penetrating a subterranean formation to reduce the loss of fluid to the formation.

2. Background of the Invention

A natural resource such as oil or gas residing in a subterranean formation can be recovered by drilling a well into the formation. The subterranean formation is usually isolated from other formations using a technique known as well cementing. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Subsequent secondary cementing operations, i.e., any cementing operation after the primary cementing operation, may also be performed. One example of a secondary cementing operation is squeeze cementing whereby a cement slurry is forced under pressure to areas of lost integrity in the annulus to seal off those areas.

Subsequently, oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. That is, a viscous fracturing fluid may be pumped down the casing to the formation at a rate and a pressure sufficient to form fractures that extend into the formation, providing additional pathways through which the oil or gas can flow to the well. Unfortunately, water rather than oil or gas may eventually be produced by the formation through the fractures therein. To provide for the production of more oil or gas, a fracturing fluid may again be pumped into the formation to form additional fractures therein. However, the previously used fractures first must be plugged to prevent the loss of the fracturing fluid into the formation via those fractures.

In addition to the fracturing fluid, other fluids used in servicing a wellbore may also be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. As a result, the service provided by such fluid is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation.

Accordingly, an ongoing need exists for compositions and methods of blocking the flow of fluid through lost circulation zones in subterranean formations.

BRIEF SUMMARY OF SOME OF THE PREFERRED EMBODIMENTS

Disclosed herein is a method of servicing a wellbore in contact with a subterranean formation, comprising: placing a wellbore servicing fluid comprising a crosslinkable polymer system and a filler into a lost circulation zone within the wellbore.

Further disclosed herein is a method of blocking the flow of fluid through a lost circulation zone in a subterranean formation comprising placing a first composition comprising a packing agent into the lost circulation zone, placing a second composition comprising a crosslinkable polymer system and a filler into the lost circulation zone, and allowing the compositions to set into place.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
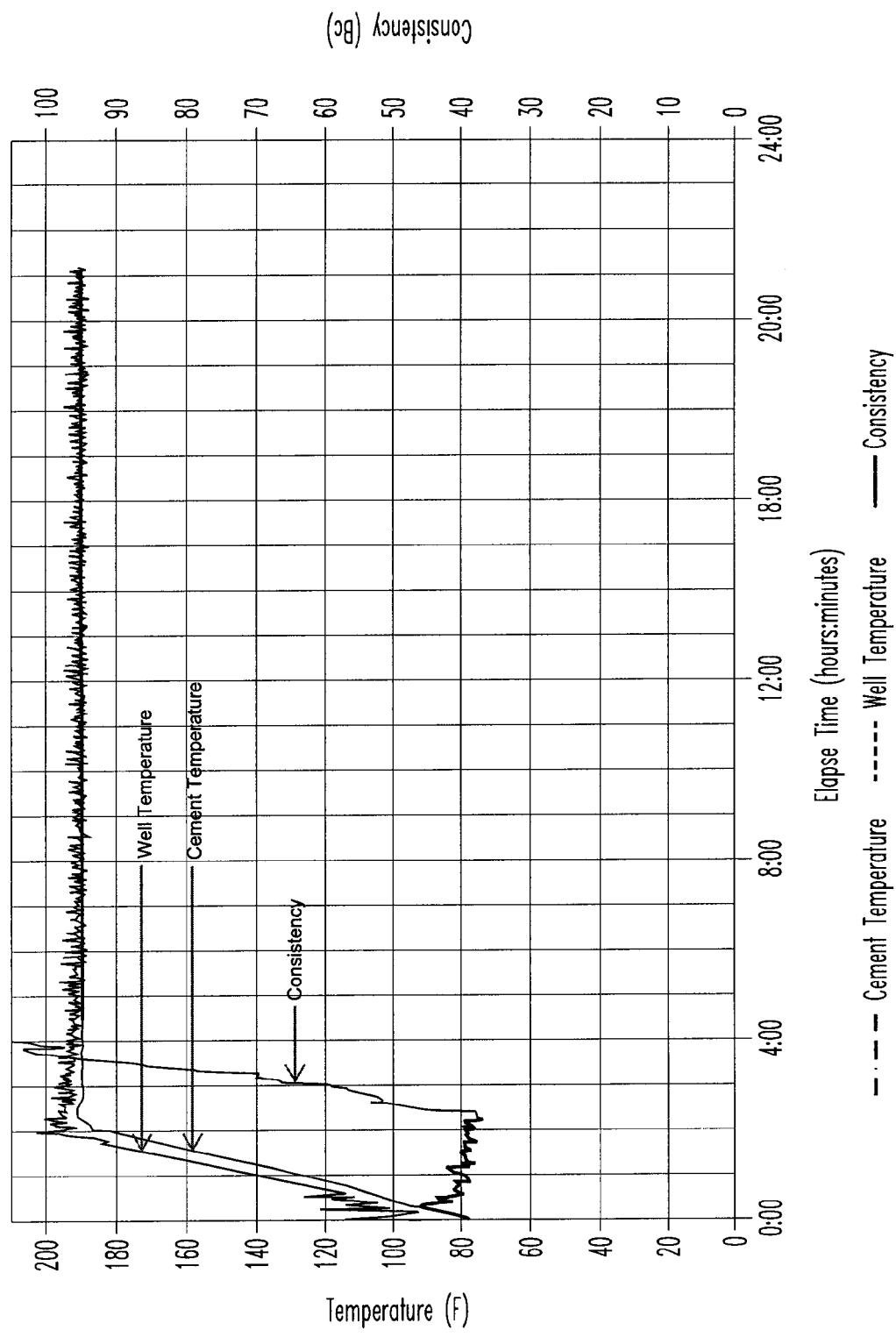
FIG. 1 is a graph of a thickening time test.

Disclosed herein are lost circulation compositions (LCC) which may be used to block the flow of fluid through lost circulation zones in a subterranean formation. The LCC may comprise a crosslinkable polymer system and a filler. Alternatively, the LCC may comprise a crosslinkable polymer system, a filler and a packing agent. LCCs such as those disclosed herein may be used to block the flow of fluid through pathways such as fractures filled with water, voids or cracks in the cement column and the casing, and so forth. Additionally, LCCs such as those disclosed herein may be used to improve wellbore pressure containment ability when introduced to areas of lost circulation.

In an embodiment, the LCC comprises a crosslinkable polymer system. Examples of suitable crosslinkable polymer systems include, but are not limited to, the following: a water soluble copolymer of a non-acidic ethylenically unsaturated polar monomer and a copolymerizable ethylenically unsaturated ester; a terpolymer or tetrapolymer of an ethylenically unsaturated polar monomer, an ethylenically unsaturated ester, and a monomer selected from acrylamide-2-methylpropane sulfonic acid, N-vinylpyrrolidone, or both; or combinations thereof. The copolymer may contain from one to three polar monomers and from one to three unsaturated esters. The crosslinkable polymer system may also include at least one crosslinking agent, which is herein defined as a material that is capable of crosslinking such copolymers to form a gel. As used herein, a gel is defined as a crosslinked polymer network swollen in a liquid medium. The crosslinking agent may be, for example and without limitation, an organic crosslinking agent such as a polyalkyleneimine, a polyfunctional aliphatic amine such as polyalkylenepolyamine, an aralkylamine, a heteroaralkylamine, or combinations thereof. Examples of suitable polyalkyleneimines include without limitation polymerized ethyleneimine and propyleneimine. Examples of suitable polyalkylenepolyamines include without limitation polyethylene- and polypropylene-polyamines. A description of such copolymers and crosslinking agents can be found in U.S. Pat. Nos. 5,836,392; 6,192,986, and 6,196,317, each of which is incorporated by reference herein in its entirety.

The ethylenically unsaturated esters used in the crosslinkable polymer system may be formed from a hydroxyl compound and an ethylenically unsaturated carboxylic acid selected from the group consisting of acrylic, methacrylic, crotonic, and cinnamic acids. The ethylenically unsaturated group may be in the alpha-beta or beta-gamma position relative to the carboxyl group, but it may be at a further distance. In an embodiment, the hydroxyl compound is an alcohol generally represented by the formula ROH, wherein R is an alkyl, alkenyl, cycloalkyl, aryl, arylalkyl, aromatic, or heterocyclic group that may be substituted with one or more of a hydroxyl, ether, and thioether group. The substituent can be on the same carbon atom of the R group that is bonded to the hydroxyl group in the hydroxyl compound. The hydroxyl compound may be a primary, secondary, iso, or tertiary compound. In an embodiment, a tertiary carbon atom is bonded to the hydroxyl group, e.g., t-butyl and trityl. In an embodiment, the ethylenically unsaturated ester is t-butyl acrylate.

The non-acidic ethylenically unsaturated polar monomers used in the crosslinkable polymer system can be amides, e.g., primary, secondary, and/or tertiary amides, of an unsaturated carboxylic acid. Such amides may be derived from ammonia, or a primary or secondary alkylamine, which may be optionally substituted by at least one hydroxyl group as in alkylol amides such as ethanolamides. Examples of such carboxylic derived ethylenically unsaturated polar monomers include without limitation acrylamide, methacrylamide, and acrylic ethanol amide.

In an embodiment, the crosslinkable polymer system is a copolymer of acrylamide and t-butyl acrylate, and the crosslinking agent is polyethylene imine. These materials are commercially available as the $H_2$ZERO service providing conformance control system from Halliburton Energy Services. The $H_2$ZERO service providing conformance control system is a combination of HZ-10 polymer and HZ-20 crosslinker. HZ-10 is a low molecular weight polymer consisting of polyacrylamide and an acrylate ester. The gelation rate of the $H_2$ZERO service providing conformance control system is controlled by the unmasking of crosslinking sites on the HZ-20 polymer which is a polyethylene imine crosslinker.

The concentrations of both HZ-10 polymer and HZ-20 crosslinker contribute to the LCC reaction time, its final mechanical properties and stability. In an embodiment, the crosslinkable polymer system forms a viscous gel in from about 60 mins to about 300 mins, alternatively in from about 60 mins to about 300 mins at a temperature of from about 180° F. to about 320° F., alternatively from about 180° F. to about 225° F. and, alternatively from about 250° F. to about 320° F. The relative amounts of HZ-10 polymer and HZ-20 crosslinker suitable for use in the preparation of LCCs of this disclosure will be described in detail later herein.

In an embodiment, the LCC comprises a filler. Herein a filler refers to particulates, also termed finer filler material, designed to bridge off across the packing agent of the LCC. Such fillers may be smaller in size than the packing agent. Details of the filler and packing agent size will be disclosed later herein. Such fillers may have a pH of from about 3 to about 10. In an embodiment, the filler has a specific gravity of less than about 1 to about 5, alternatively from about 1.5 to about 5, alternatively from about 1.75 to about 4. Without wishing to be limited by theory, fillers having a specific gravity in the disclosed range may produce a LCC with greater flexibility and ductility.

Examples of suitable fillers include without limitation alkyl quaternary ammonium montmorillonite, bentonite, zeolites, barite, fly ash, calcium sulfate, and combinations thereof. In an embodiment the filler is an alkyl quarternary ammonium montmorillonite. In an embodiment, the filler is a water swellable or hydratable clay. In an alternative embodiment, the filler is an oil-based sealing composition that may comprise a hydratable polymer, an organophillic clay and a water swellable clay. Such oil-based sealing compositions are disclosed in U.S. Pat. Nos. 5,913,364; 6,167,967; 6,258,757, and 6,762,156, each of which is incorporated by reference herein in its entirety. In an embodiment, the filler material is FLEXPLUG lost circulation material, which is an oil-based sealing composition comprising alkyl quaternary ammonium montmorillonite commercially available from Halliburton Energy Services.

In an embodiment, the LCC optionally comprises a packing agent. Examples of packing agents include without limitation resilient materials such as graphite; fibrous materials such as cedar bark, shredded cane stalks and mineral fiber; flaky materials such as mica flakes and pieces of plastic or cellophane sheeting; and granular materials such as ground and sized limestone or marble, wood, nut hulls, formica, corncobs, gravel and cotton hulls. In an embodiment, the packing agent is a resilient graphite such as STEELSEAL or STEELSEAL FINE lost circulation additives which are dual composition graphite derivatives commercially available from Baroid Industrial Drilling Products, a Halliburton Energy Services company.

In another embodiment, the packing agent is a resin-coated particulate. Examples of suitable resin-coated particulates include without limitation resin-coated ground marble, resin-coated limestone, and resin-coated sand. In an embodiment, the packing agent is a resin-coated sand. The sand may be graded sand that is sized based on a knowledge of the size of the lost circulation zone. The graded sand may have a particle size in the range of from about 10 to about 70 mesh, U.S. Sieve Series. The graded sand can be coated with a curable resin, a tackifying agent or mixtures thereof. The hardenable resin compositions useful for coating sand and consolidating it into a hard fluid permeable mass generally comprise a hardenable organic resin and a resin-to-sand coupling agent. Such resin compositions are well known to those skilled in the art, as is their use for consolidating sand into hard fluid permeable masses. A number of such compositions are described in detail in U.S. Pat. Nos. 4,042,032, 4,070,865, 4,829,100, 5,058,676 and 5,128,390 each of which is incorporated herein by reference in its entirety. Methods and conditions for the production and use of such resin coated particulates are disclosed in U.S. Pat. Nos. 6,755,245; 6,866,099; 6,776,236; 6,742,590; 6,446,722, and 6,427,775, each of which is incorporated herein by reference in its entirety. An example of a resin suitable for coating the particulate includes without limitation SANDWEDGE NT conductivity enhancement system that is a resin coating commercially available from Halliburton Energy Services.

In some embodiments, additives may be included in the LCC for improving or changing the properties thereof. Examples of such additives include but are not limited to salts, accelerants, surfactants, set retarders, defoamers, settling prevention agents, weighting materials, dispersants, vitrified shale, formation conditioning agents, or combinations thereof. Other mechanical property modifying additives, for example, are carbon fibers, glass fibers, metal fibers, minerals fibers, and the like which can be added to further modify the mechanical properties. These additives may be included singularly or in combination. Methods for introducing these additives and their effective amounts are known to one of ordinary skill in the art.

In an embodiment, the LCC includes a sufficient amount of water to form a pumpable slurry. The water may be fresh water or salt water, e.g., an unsaturated aqueous salt solution or a saturated aqueous salt solution such as brine or seawater.

In an embodiment, the LCC comprises a crosslinkable polymer system and a filler. In such an embodiment, the crosslinkable polymer system may be present in an amount of from about 35% to about 90% by volume, and the filler may be present in an amount of from about 8% to about 40% by volume.

Alternatively, the LCC comprises a crosslinkable polymer system, a filler and a packing agent. In such an embodiment, the crosslinkable polymer system may be present in an amount of from about 30% to about 90% by volume, the filler may be present in an amount of from about 8% to about 40% by volume, and the packing agent may be present in an amount of from about 1% to about 10% by volume.

The components of the LCC may be combined in any order desired by the user to form a slurry that may then be placed into a wellbore experiencing lost circulation. The components of the LCC may be combined using any mixing device compatible with the composition, for example a bulk mixer. In an embodiment, the components of the LCC are combined at the site of the wellbore experiencing lost-circulation. Alternatively, the components of the LCC are combined off-site and then later used at the site of the wellbore experiencing lost circulation. Methods for the preparation of a LCC slurry are known to one of ordinary skill in the art.

In an embodiment an LCC is prepared by combining the crosslinkable polymer system $H_2ZERO$ service providing conformance control system with a filler, FLEXPLUG OBM lost circulation material. In such an embodiment, the LCC is prepared by combining from about 35% to about 90% by volume $H_2ZERO$ service providing conformance control system with from about 8% to about 40% by volume FLEXPLUG OBM lost circulation material.

The $H_2ZERO$ service providing conformance control system is prepared by mixing the HZ-10 low molecular weight polymer consisting of polyacrylamide and an acrylate ester with the HZ-20 polyethylene imine crosslinker. The relative amounts of HZ-10 and HZ-20 to be used in the preparation of $H_2ZERO$ can be adjusted to provide gelling within a specified time frame based on reaction conditions such as temperature and pH. For example, the amount of HZ-20 crosslinker necessary for gelling is inversely proportional to temperature wherein higher amounts of HZ-20 are required at lower temperatures to effect formation of a viscous gel. Additionally, gel time can be adjusted to compensate for the pH of the filler material. Adjustment of the $H_2ZERO$ service providing conformance control system to provide optimum gelling as a function of temperature and/or pH is known to one of ordinary skill in the art. The filler, FLEXPLUG OBM lost circulation material is an oil-based sealing composition comprising alkyl quaternary ammonium montmorillonite. Without wishing to be limited by theory, such oil-based sealing compositions may function by the hydratable polymer reacting with water in the well bore to immediately hydrate and form a highly viscous gel. The water swellable clay then immediately swells in the presence of water and together with the viscous gel forms a highly viscous sealing mass. The organophillic clay may then react with an oil carrier fluid to add viscosity to the composition so that the polymer and clay do not settle out of the oil prior to reacting with water in the well bore.

In an embodiment, the LCCs of this disclosure when placed in a lost circulation zone produce a permanent plug that is flexible, adhesive and of appreciable compressive strength. In an embodiment, the LCCs of this disclosure have an appreciable static gel strength (SGS).

The LCCs disclosed herein may be used as wellbore servicing fluids. As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids or completion fluids, all of which are well known in the art. The servicing fluid is for use in a wellbore that penetrates a subterranean formation. It is to be understood that "subterranean formation" encompasses both areas below exposed earth and areas below earth covered by water such as ocean or fresh water.

The LCCs may be introduced to the wellbore to prevent the loss of aqueous or non-aqueous drilling fluids into lost circulation zones such as voids, vugular zones, and natural or induced fractures while drilling. In an embodiment, the LCC is placed into a wellbore as a single stream and activated by downhole conditions to form a barrier that substantially seals lost circulation zones. In such an embodiment, the LCC may be placed downhole through the drill bit forming a composition that substantially eliminates the lost circulation. In yet another embodiment, the LCC is formed downhole by the mixing of a first stream comprising one or more LCC components and a second stream comprising additional LCC components. For example, the LCC may be formed downhole by the mixing of a first stream comprising a packing agent and a second stream comprising a crosslinkable polymer system and a filler. Methods for introducing compositions into a wellbore to seal subterranean zones are described in U.S. Pat. Nos. 5,913,364; 6,167,967; and 6,258,757, each of which is incorporated by reference herein in its entirety.

The LCC may form a non-flowing, intact mass inside the lost circulation zone which plugs the zone and inhibits loss of subsequently pumped drilling fluid, which allows for further drilling. It is to be understood that it may be desired to hasten the viscosification reaction for swift plugging of the voids. Alternatively, it may be desired to prolong or delay the viscosification for deeper penetration into the voids. For example the LCC may form a mass that plugs the zone at elevated temperatures, such as those found at higher depths within a wellbore.

In an embodiment, the LCCs may be employed in well completion operations such as primary and secondary cementing operations. The LCC may be placed into an annulus of the wellbore and allowed to set such that it isolates the subterranean formation from a different portion of the wellbore. The LCC thus forms a barrier that prevents fluids in that subterranean formation from migrating into other subterranean formations. In an embodiment, the wellbore in which the LCC is positioned belongs to a multilateral wellbore configuration. It is to be understood that a multilateral wellbore configuration includes at least two principal wellbores connected by one or more ancillary wellbores.

In secondary cementing, often referred to as squeeze cementing, the LCC may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat. Nos. 5,346,012 and 5,588,488, which are incorporated by reference herein in their entirety.

In other embodiments, additives are also pumped into the wellbore with LCC. For example and without limitation, fluid absorbing materials, resins, aqueous superabsorbers, viscosifying agents, suspending agents, dispersing agents, or combinations thereof can be pumped in the stream with the LCCs disclosed.

The LCCs of this disclosure may provide lost circulation control in a sufficiently short time period to prevent the operator from pulling out of the hole and thus reducing nonproductive rig time. Without wishing to be limited by theory, the packing agent may immediately pack off into the lost circulation zones in the subterranean formation. The filler may then squeeze into the lost circulation zones forming a bridge between the larger sized packing agent. Finally, the thermally activated crosslinkable polymer system may gel into place to produce a permanent plug that is flexible, adhesive and of appreciable compressive strength. In addition, due to the filler within the slurry the amount of crosslinkable polymer system squeezed into the matrix of the surrounding rock may be minimized thus providing a finite layer of rock adjacent to the plug that has negligible permeability and avoids formation damage.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Comparative Example

The ability of H$_2$ZERO service providing conformance control system to produce a suitable LCC was evaluated. H$_2$ZERO service providing conformance control system is a crosslinkable polymer system commercially available from Halliburton Energy Services. An H$_2$ZERO service providing conformance control system slurry was designed for temperatures in the range of 120° F. to 190° F., which contained an extremely high percent of HZ-20, Table 1.

TABLE 1

| Component | Percent of Slurry Weight |
| --- | --- |
| HZ-10 | 35.5% |
| HZ-20 | 48.2% |
| Water | 16.3% |

Two samples of the base H$_2$ZERO service providing conformance control system product were mixed and placed in a water bath at 130° F. overnight to confirm the recipe would gel within a reasonable time at the lower temperature. Both samples made a clear ringing gel that was strong but did not hold up to impact and did not exhibit qualitatively detectable flexibility. Further, when the product was over-stressed its failure mode was akin to bursting. The product easily broke apart.

Example 1

The ability of H$_2$ZERO service providing conformance control system to form an LCC with FLEXPLUG OBM lost circulation material was evaluated. FLEXPLUG OBM lost circulation material is an oil-based sealing composition commercially available from Halliburton Energy Services. The H$_2$ZERO service providing conformance control system had an adverse effect on the latex contained within the FLEXPLUG OBM lost circulation material slurry. The FLEXPLUG OBM lost circulation material was then used as a drymix filler in the H$_2$ZERO service providing conformance control system slurry. A 9.3 ppg slurry was targeted as this is the density of the typical FLEXPLUG OBM lost circulation material slurry. Table 2 lists the components and amounts used to design the H$_2$ZERO/FLEXPLUG OBM slurry.

TABLE 2

| Component | Percent of Slurry Weight |
| --- | --- |
| Water | 6.9% |
| HZ-10 | 15.0% |
| HZ-20 | 59.3% |
| FLEXPLUG OBM Drymix lost circulation material | 18.9% |

The samples were heated overnight in a water bath at 130° F. The final gelled product was much different than the gelled product of the base H$_2$ZERO service providing conformance control system described in the Comparative Example. The H$_2$ZERO/FLEXPLUG OBM gelled product exhibits great flexibility, increased toughness, improved resilience and increased durability to impact. In addition, the H$_2$ZERO/FLEXPLUG OBM gelled product remained "tacky" unlike the original H$_2$ZERO service providing conformance control system gelled product.

The above slurry was then tested for pumpability in an HPHT Consistometer at a constant pressure of 1000 psi. The temperature was programmed to initiate the test at 80° F., ramp to 130° F. over a one-hour period, and then ramp to 190° F. over a two-hour period. Table 3 contains the consistency readings from this test which is also graphed in FIG. 1.

TABLE 3

| Test Time (hh:mm) | Test Temperature (° F.) | Consistency (Bc)[1] |
|---|---|---|
| 0:00 | 80 | 30 |
| 3:09 | 190 | 70 |
| 3:43 | 190 | 100 |

[1]Bearden consistency

Typically, a fluid is considered "non-pumpable" once it exceeds 70 Bc. The results demonstrate that the compositions remain pumpable until they reach the desired temperature at which point they rapidly form a highly flexible, durable and adhesive product.

Example 2

A slurry was prepared as described in Example 1 and the SGS determined as a function of temperature. The static gel strength development test requires specialized equipment, such as the MACS Analyzer or the MINIMACS Analyzer. This equipment measures the shear resistance of a slurry under downhole temperature and pressure while the slurry remains essentially static. The test is conducted by mixing the slurry and placing into the specialized testing device. The slurry is then stirred and heated to a bottomhole circulating temperature (BHCT) and downhole pressure according to the same schedule as the thickening time test. After the slurry reaches the BHCT, stirring is stopped and the slurry is allowed to essentially remain static. The stirring paddle is rotated at a rate of about 0.5°/min while the shear resistance on the paddle is measured. The shear resistance is correlated to the SGS (units are lbf/100 ft$^2$) and a plot of SGS development is made as a function of time.

Figure 2:
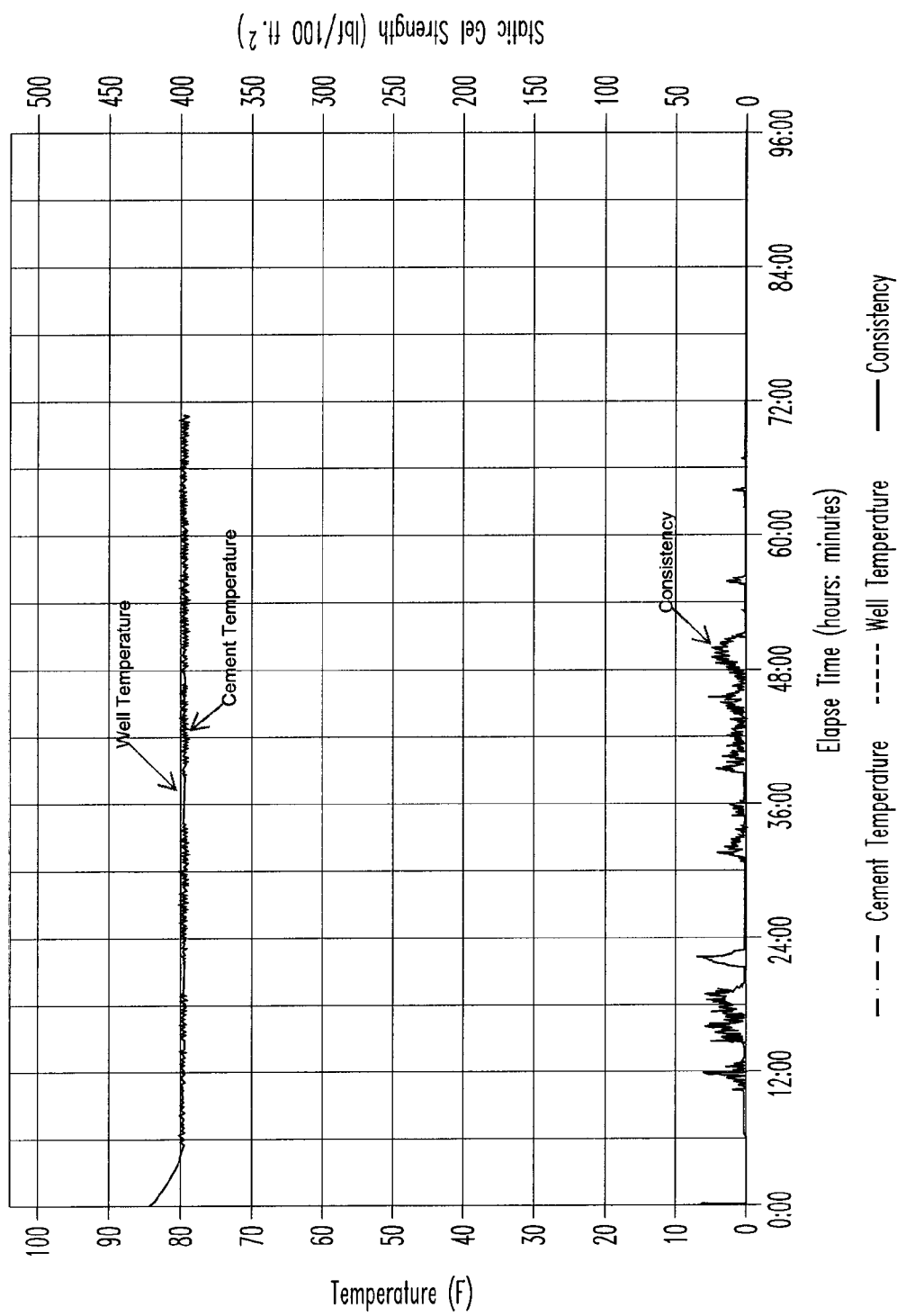
FIGS. 2-5 are graphs of a static gel strength test.
Figure 3:
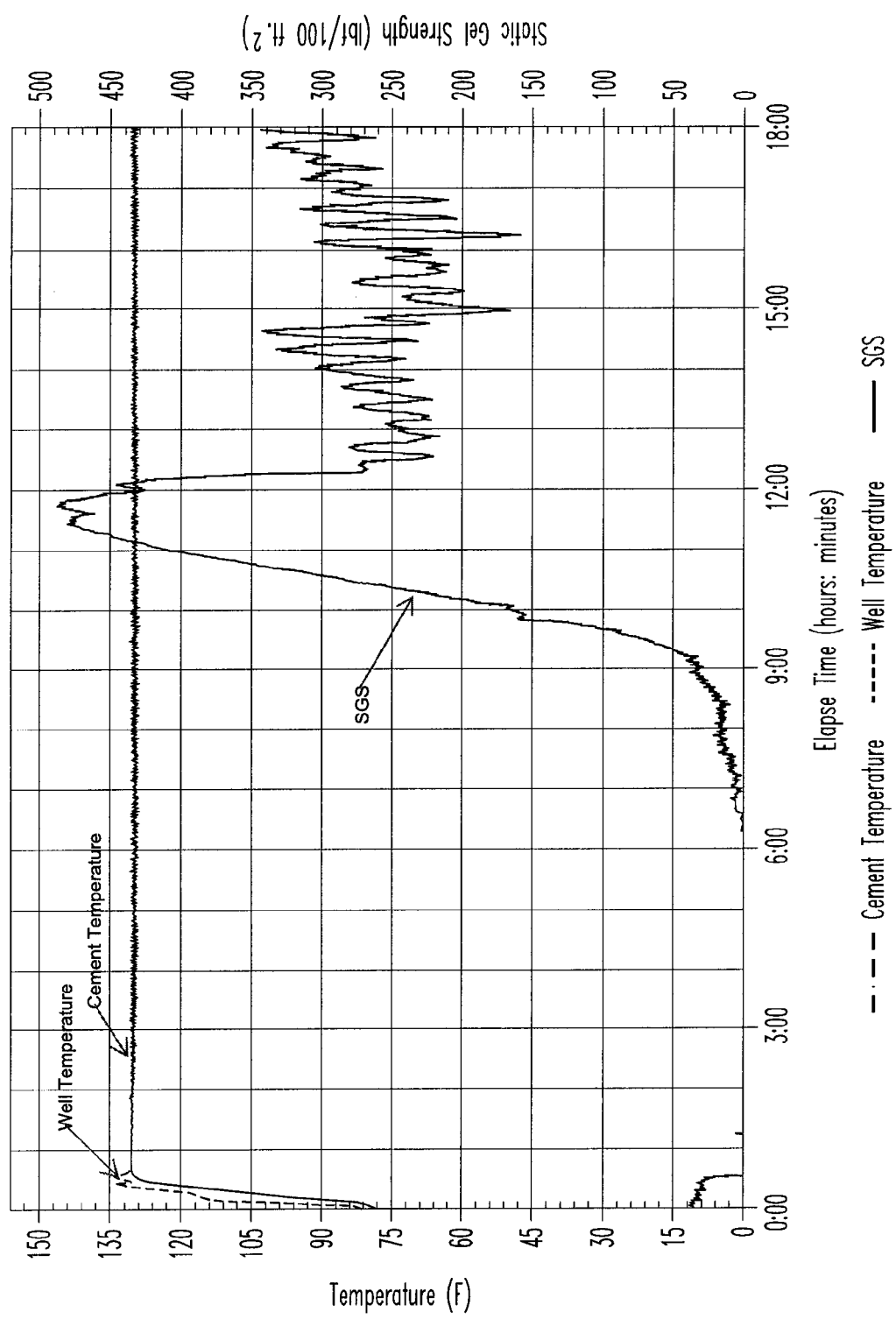
Figure 4:
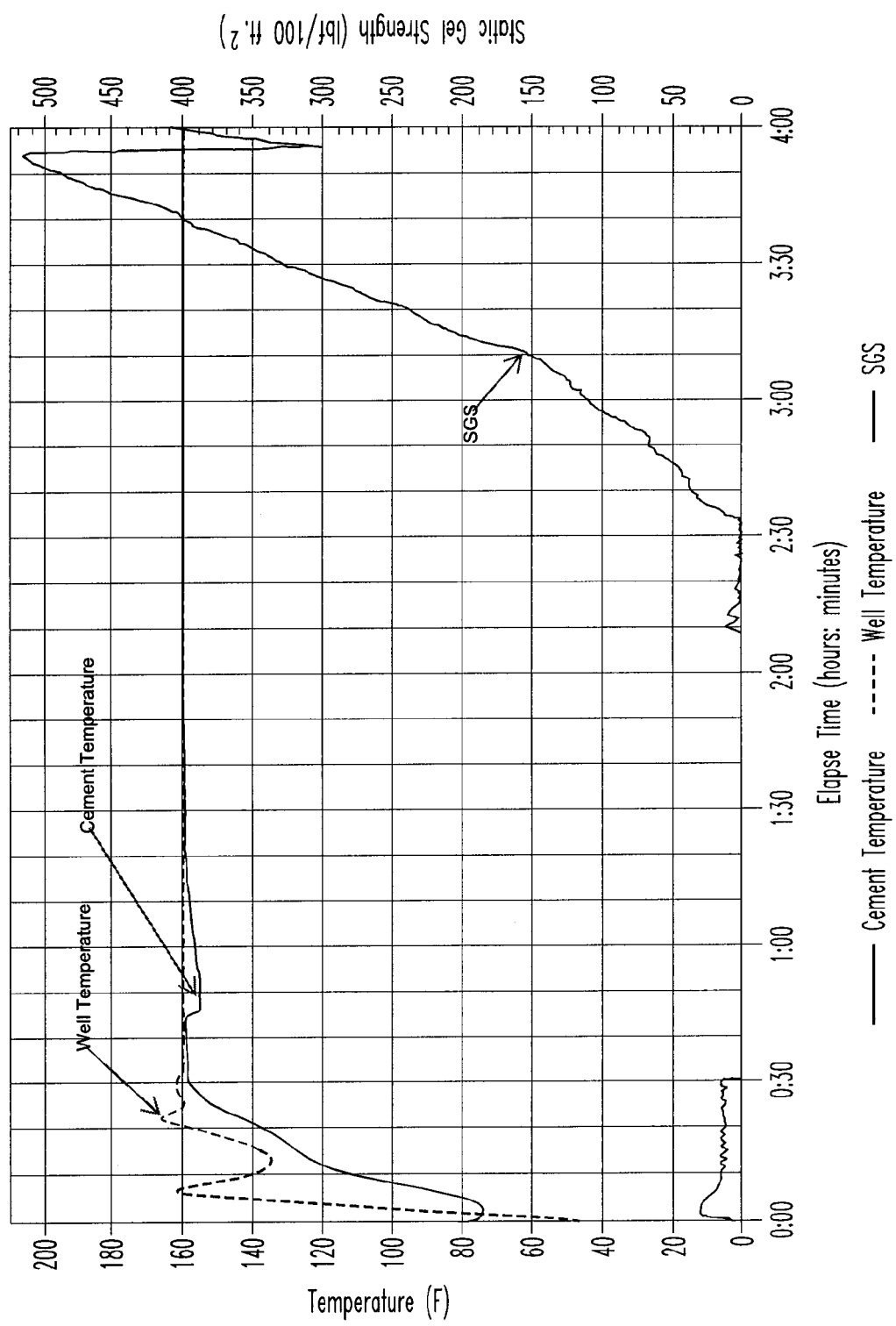
Figure 5:
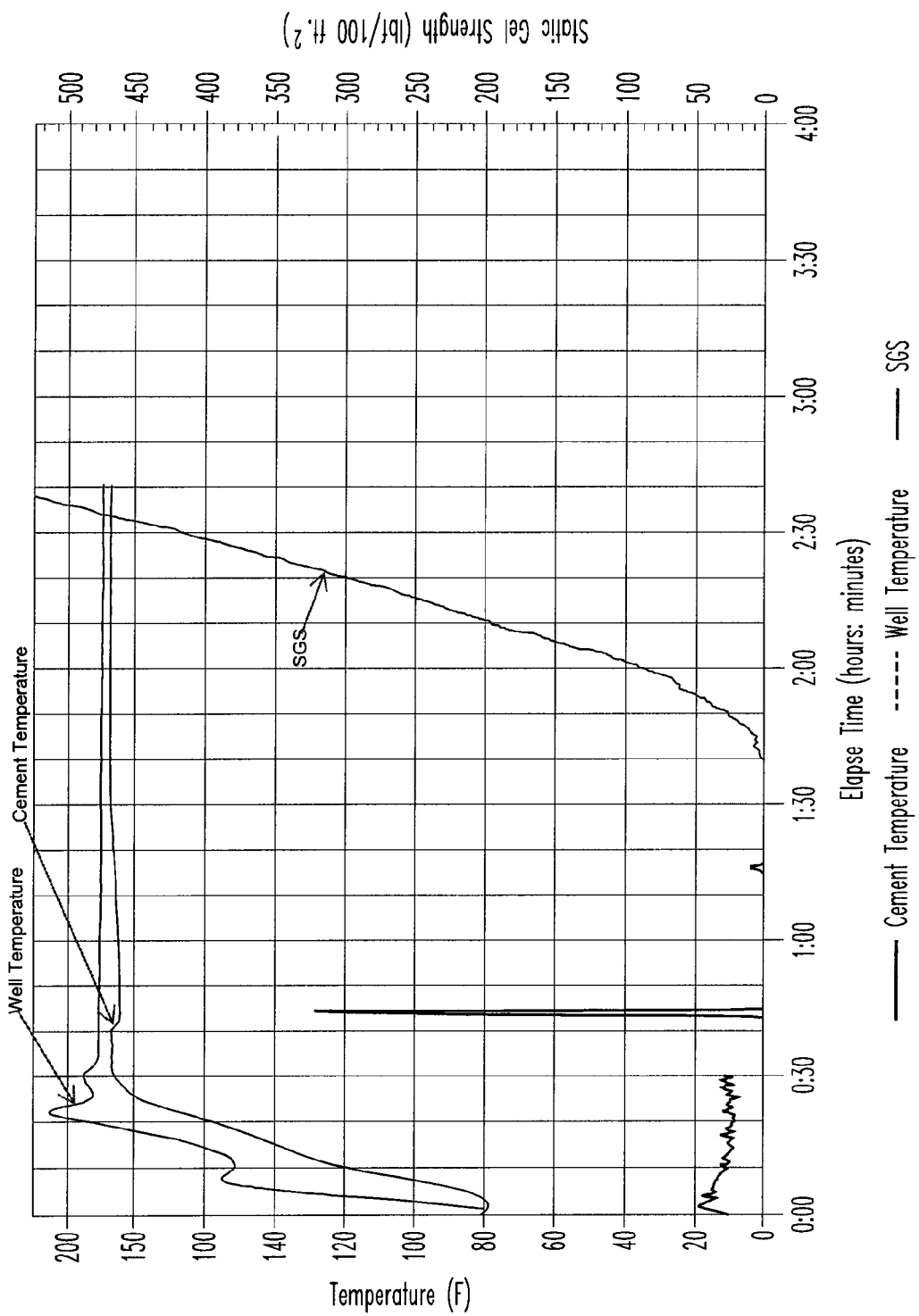

FIG. 2 is a graph of the results of an SGS test conducted at 80° F., FIG. 3 is a graph of results of an SGS test conducted at 130° F.; FIG. 4 is a graph of results of an SGS test conducted at 160° F., and FIG. 5 is a graph of results from an SGS test conducted at 190° F. The results demonstrate the formation of static gel strength more rapidly at increased temperatures.

Example 3

An additional H$_2$ZERO/FLEXPLUG OBM formulation was prepared according to Table 4.

TABLE 4

| Component | Volume (cc) |
|---|---|
| Tap Water | 47 |
| HZ-10 | 97 |
| HZ-20 | 38 |
| FLEXPLUG OBM | 74 |
| Drymix lost circulation material | (129 g) |

The materials in Table 4 were mixed in a MINIMACS for 25 minutes at 1000 psi until it reached the preset temperature of 80° F., 130° F., 160° F. or 190° F. Then the MINIMACS set static at t=30 minutes and SGS (lbf/100 sq. ft.) recorded v. time. Four tests were conducted, one at each of the temperatures given. Raw SGS data are given in Table 5. Analysis of the data revealed the need to model SGS as a function of a "shifted time" defined as follows:

$$\text{Shifted time} = t - t_{\textit{offset},T} \quad (1)$$

Where: t=time of mixing, with t=0 materials added to mixing container; t=30 min went to static conditions; and $t_{\textit{offset},T}$=offset time (min) at the set point temperature of T (F.).

The room temperature (80° F.) tests never exceeded 40 lbf/100 sq.ft., thus indicating that some initial minimum temperature is required to initiate the kinetic reaction(s) that produce the Theological changes resulting in substantial gel strength. It is assumed that SGS is a direct indicator of yield point of the LCC.

Figure 6:
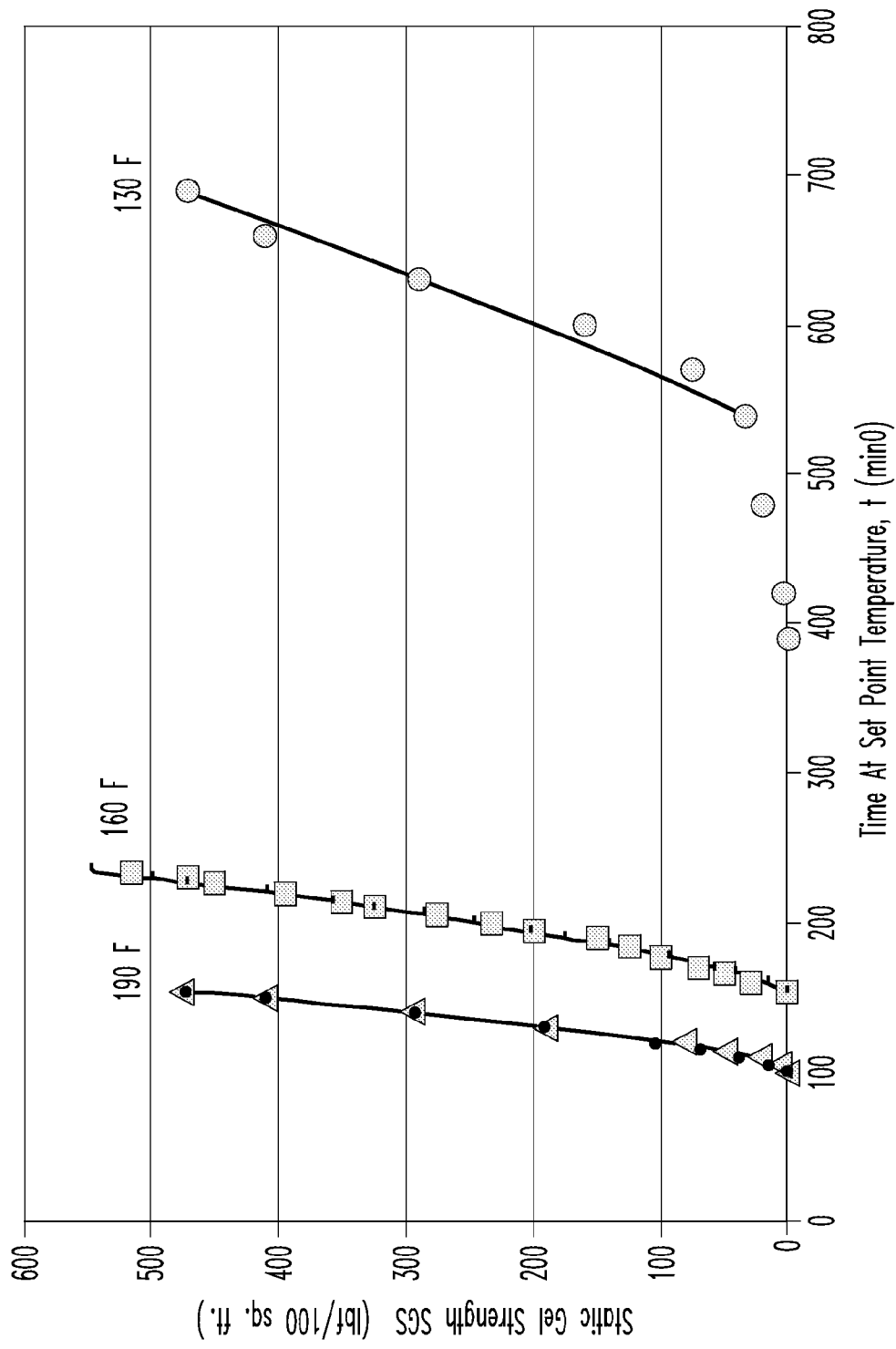
FIG. 6 is a graph of predicted versus observed static gel strength.

FIG. 6 contains the SGS vs time data for the 130° F., 160° F. and 190° F. samples along with the prediction fit of the generalized model in Eq (2).

$$SGS = (t - t_{\textit{offset},T})^{\alpha_T} \quad (2)$$

where: $\alpha_T$ is the "psuedo reaction rate constant" which is a function of temperature.

TABLE 5

| Time | Static Gel Strength, SGS, (lbf./100 sq.ft.) | | |
|---|---|---|---|
| (mins.) | 130° F. | 160° F. | 190° F. |
| 154 | | 1 | |
| 160 | | 30 | |
| 166 | | 50 | |
| 170 | | 70 | |
| 177 | | 100 | |
| 185 | | 125 | |
| 190 | | 150 | |
| 194 | | 200 | |
| 200 | | 233 | |
| 205 | | 275 | |
| 210 | | 325 | |
| 214 | | 350 | |
| 220 | | 395 | |
| 227 | | 450 | |
| 230 | | 470 | |
| 235 | | 515 | |
| 390 | 1 | | |
| 420 | 5 | | |
| 480 | 20 | | |
| 540 | 35 | | |
| 570 | 75 | | |
| 600 | 160 | | |
| 630 | 290 | | |
| 660 | 410 | | |
| 690 | 470 | | |
| 100 | | | 1 |
| 105 | | | 8 |
| 110 | | | 22 |
| 115 | | | 50 |
| 120 | | | 82 |
| 130 | | | 190 |
| 140 | | | 295 |
| 150 | | | 410 |
| 155 | | | 475 |

TABLE 6

| Parameters: | | | |
|---|---|---|---|
| Temp (F.) | $\alpha_T$ | $t_{\textit{offset},T}$ (min) | Time To Reach SGS = 500 (min) |
| 130 | 1.2 | 520 | 710 |
| 160 | 1.43 | 153 | 230 |
| 190 | 1.53 | 99 | 160 |

The results demonstrate that deploying the "time shift" concept resulted in a simple but very accurate model for all three temperatures tested. Best-fit values of the parameters in Eq (2) are given in Table 6. Note how the reaction rate exponent, $\alpha_T$, is a function of temperature, as well as the "time shift" parameter $t_{\textit{offset},T}$. Also given in Table 6 is the "time to reach SGS=500 lbf/100 sq.ft.," and note its sensitivity to temperature as well.

Example 4

Preliminary measurements of the mechanical properties of the H₂ZERO/FLEXPLUG OBM gelled product were conducted. For the base slurry recipe given in Tables 2 and 4, rudimentary testing for the purpose of capturing gross compressive strength estimates and visual depictions of flexibility and resilience were performed on three samples of the resultant product. These tests were performed by placing the samples on a Tinius-Olsen machine and gradually increasing the compressive load, while measuring the change in height. The Tinius-Olsen machine is used to test compressive strength. The compressive load was increased until the sample exhibited failure in the form of permanent tears in the axial direction. Resilience was exhibited by the product returning to near its original height and diameter when loads were released. In all three cases, the sample returned to its original shape until the point of failure. As can be seen by the photographs taken of one failed sample in FIG. 11, even at this time the sample returns to near its original shape.

Figure 7:
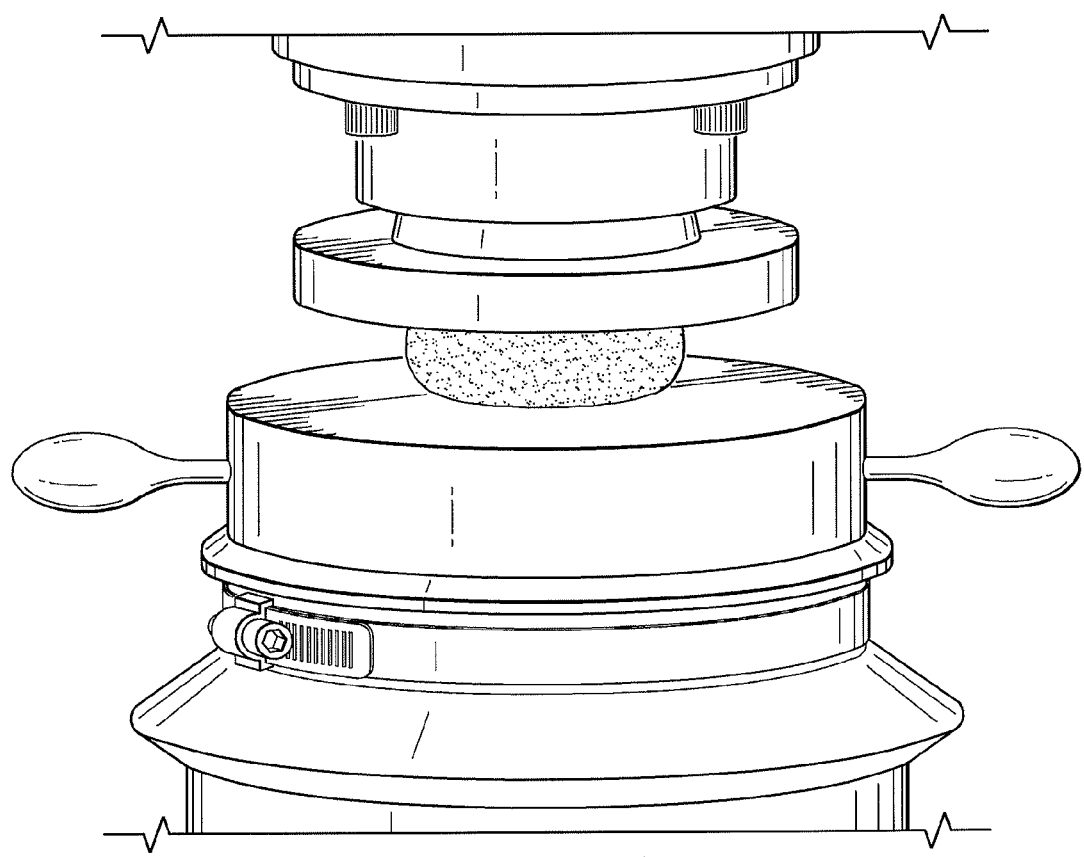
FIGS. 7-11 are pictures of a lost circulation composition.
Figure 8:
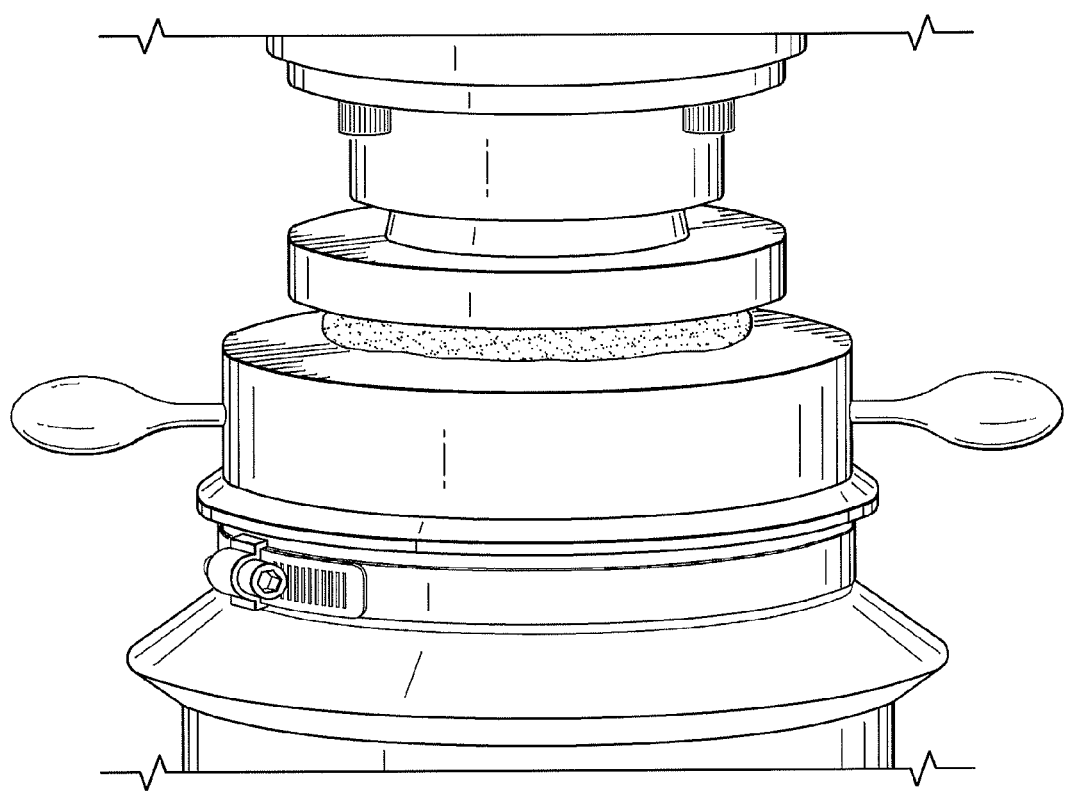
Figure 9:
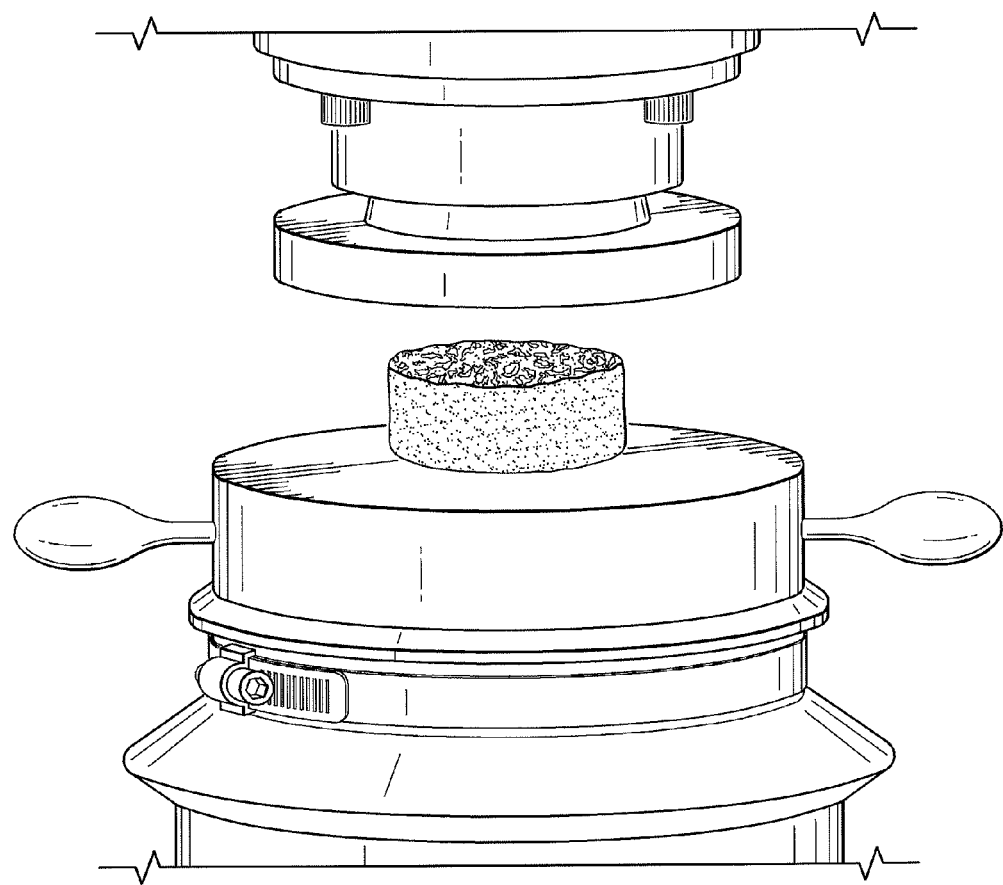
Figure 10:
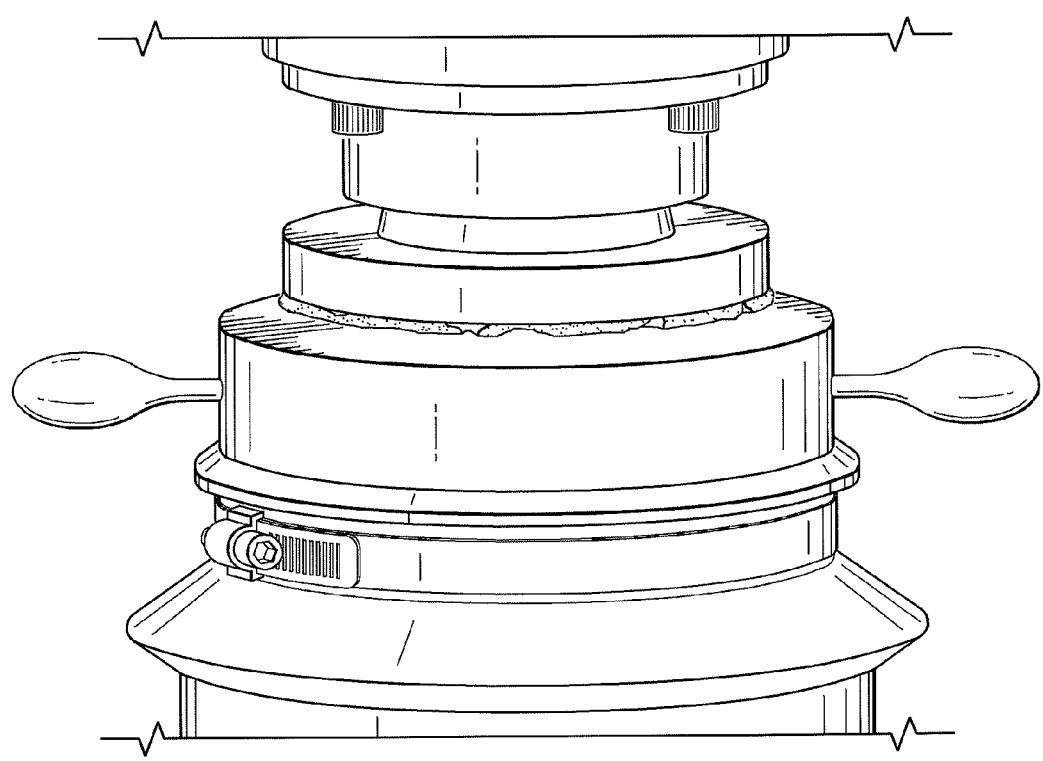
Figure 11:
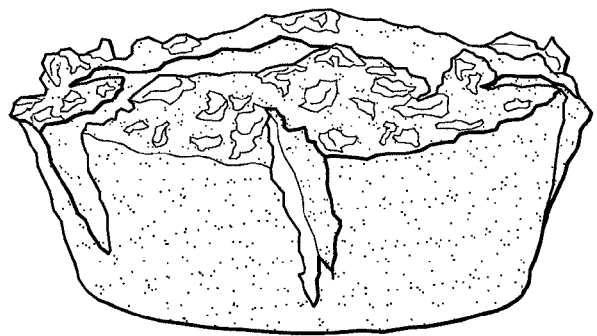

FIG. 7 shows a sample with original dimensions of 3 inch diameter and 2 inch height with a 50 lb compressive load applied. The sample, under this load, had deformed to a height of approximately 1 inch and a diameter of approximately 4¼ inches. FIG. 8 shows this same sample under a 100 lb compressive load. The sample, under this load, had deformed to a height of approximately ½ inch and a diameter of approximately 6 inches. FIG. 9 shows this same sample after the 100 lb load has been removed. The sample has returned to its original dimensions and shape with no discernible permanent deformation. A similar result was obtained when the sample was subjected to a 150 lb compressive load (not shown). FIG. 10 shows this same sample under a 200 lb compressive load. As can be seen by the presence of cracks along the diameter of the specimen, the sample has now failed. Since failure detection was purely through visual confirmation, it can only be stated the specimen failed between 150 and 200 lbs of compressive force. FIG. 11 shows the failed sample after it is taken from the Tinius-Olsen. As can be seen in this photograph, the sample returns to near its original shape even after the "starburst" shaped rupture.

Example 5

The compression tests described in Example 4 were repeated with two smaller samples with a height of 1 inch and a diameter of 2 inches. The results were similar to those seen with the larger sample. In general, all three tests showed that a sample can be deformed to approximately 27% of its original height and 2 times it original diameter before the repeatable starburst rupture failure occurs. Failure appears to be dependent more on the limitations of deformation the specimen can undergo, rather than the pressure applied. For instance, on the smaller diameter samples it again took between 150 and 200 lbs of compressive load before the sample failed. For the smaller sample this equates to more than twice the pressure at failure than the larger sample, but both samples appeared to fail at approximately the same percent reduction in height.

Example 6

In addition to compressive loading tests, two 6 inch long synthetic rock cores with fractures tapering from 4.5 mm to 1.5 mm were packed with the H₂ZERO/FLEXPLUG OBM slurry containing a mixture of STEELSEAL FINE and BARACARB 600 products as the packing agent, Table 7. BDF-391 and BDF-393 are lost circulation additives with a d50 particle size distribution of approximately 725 and 1125 microns respectively. The d50 particle size distribution specifies a size for which 50% of the total volume of particles is smaller in size than the value. Packing agent particulates were added to achieve an 80 ppb loading. STEELSEAL FINE lost circulation additive is a resilient graphite material commercially available from Halliburton Energy Services. BARACARB 600 bridging agent is a sized calcium carbonate commercially available from Halliburton Energy Services.

TABLE 7

| Material | Liquid Volume (cc) | Solid Weight (g) |
| --- | --- | --- |
| Water | 113 | |
| HZ-10 | 75 | |
| HZ-20 | 26 | |
| FLEXPLUG OBM lost circulation material | | 65 |
| BDF-391 | | 6 |
| BDF-393 | | 17 |
| BARACARB 600 bridging agent | | 29 |
| STEELSEAL FINE lost circulation additive | | 8 |

The cores were packed in the Extrusion Rheometer on a Tinius-Olsen machine. Both cores were packed at a pressure of approximately 280 psi. The cores were then heated in a water-bath at 190° F. overnight. Each core was then placed in the Hassler sleeve Dislodgment Apparatus and pressured until the fracture plug failed. The first core dislodged at 820 psi and the second dislodged at 640 psi. In comparison, FLEXPLUG OBM lost circulation material tends to fail at pressures of 150 psi or less in this same fracture geometry.

Example 7

Filler materials other than FLEXPLUG OBM drymix lost circulation material were used to produce slurries similar to that listed in Table 4 for the purpose of qualitative comparison of such discernable characteristics as flexibility, gel time and firmness. The fillers investigated, and the relative rating of the resultant product characteristics are listed in Table 8. FLEXPLUG OBM drymix appeared to produce the most favorable end product due to its extreme flexibility, durability, resilience and tackiness. FLEXPLUG W lost circulation material is a sealing composition, FLY ASH retarder is a coal combustion product, CAL SEAL gypsum additive is a gypsum cement, FDP-C661-02 additive and FDP-C661VA-02 accelerating component are compressive strength accelerants, all of which are commercially available from Halliburton Energy Services. BAROID weighting material is barium sulfate, which is commercially available from Baroid Industrial Drilling Products a Halliburton Energy Services company. FLEXPLUG OBM lost circulation material was the only filler tested that produced an end product with an appreciable "tackiness."

TABLE 8

| Filler | Gel Time | Flexibility | Strength |
| --- | --- | --- | --- |
| FLEXPLUG OBM lost circulation material | Excellent | Excellent | Good |
| FLEXPLUG W lost circulation material | Excellent | Excellent | Good |
| FDP-C661-02 additive | Excellent | Fair | Fair |
| FDP-C661VA-02 accelerating component | Excellent | Good | Excellent |

TABLE 8-continued

| Filler | Gel Time | Flexibility | Strength |
|---|---|---|---|
| BAROID weighting material | Excellent | Fair to Poor | Fair |
| FLY ASH retarder | Excellent | Fair | Excellent |
| CAL SEAL gypsum additive | Poor | Fair | Good |

Example 8

Several traditional particulate packing agent products were used to produce slurries similar to that listed in Table 4 for the purpose of qualitative comparison of such discernable characteristics as flexibility, gel time and firmness. HYDROPLUG lost circulation plug is a self-expanding lost circulation material commercially available from Halliburton Energy Services. For each packing agent or packing material, the slurry recipe listed in Table 4 was loaded to an equivalent of 80 ppb of the packing agent. Table 9 lists the observations of the final products with these various packing agents. Packing quality was determined by how distinct (segregated) the pack layer was. If the packing agent remained dispersed it was given a fair rating where a packing agent that created a thick, delineated packing layer was given an excellent rating.

TABLE 9

| Packing Material | Tackiness | Firmness | Packing Quality |
|---|---|---|---|
| BARACARB 600 bridging agent | Good | Fair | Excellent |
| HYDROPLUG lost circulation plug | Fair | Good | Good |
| STEELSEAL lost circulation addditive | Fair | Good | Good |
| FLEXPLUG OBM lost circulation material | Excellent | Fair | Poor |

Example 9

A base slurry as described in Tables 2 and 4 was prepared. To this base slurry, 100 g of SANDWEDGE conductivity enhancement system coated gravel was added as the packing agent. The resultant material displayed enhanced resiliency and flexibility when compared to the composition without the resin-coated gravel.

It has been found that by adding the filler FLEXPLUG OBM lost circulation material drymix to the crosslinkable polymer system H$_2$ZERO service providing conformance control system in combination with any one of a number of particulate packing agent products, a highly flexible, durable and adhesive product is formed. This product, via the particulate packing agent, provides an immediate short-term plug so that the driller can continue to drill ahead. In addition, the thermally activated FLEXPLUG/H$_2$ZERO gel produces a long-term plug that also creates a limited invasion zone within the matrix of the nearby rock, creating a greatly reduced permeability zone to further strengthen the plug While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in contact with a subterranean formation, comprising:
    circulating a first wellbore servicing fluid in the wellbore; and
    upon loss of circulation, placing a second wellbore servicing fluid comprising a crosslinkable polymer system having a crosslinking agent, a filler, and a packing agent into a lost circulation zone within the wellbore, wherein the filler comprises a dry mix of an oil-based sealing composition and wherein the crosslinkable polymer system forms a viscous gel in from about 60 mins to about 300 mins.

2. The method of claim 1 wherein the crosslinkable polymer system comprises a material selected from the group consisting of water soluble copolymer of a non-acidic ethylenically unsaturated polar monomer and a copolymerizable ethylenically unsaturated ester; a water soluble terpolymer or tetrapolymer of an ethylenically unsaturated polar monomer, an ethylenically unsaturated ester, and a monomer selected from acrylamide-2-methylpropane sulfonic acid, N-vinylpyrrolidone, or both; or combinations thereof; and wherein the crosslinking agent comprises a polyalkyleneimine, a polyfunctional aliphatic amine, an aralkylamine, a heteroaralkylamine, and combinations thereof.

3. The method of claim 1 wherein the crosslinkable polymer system comprises a copolymer of acrylamide and t-butyl acrylate and the crosslinking agent comprises polyethylene imine.

4. The method of claim 3 wherein the filler comprises alkyl quaternary ammonium montmorillonite.

5. The method of claim 1 wherein the crosslinkable polymer system is thermally activated.

6. The method of claim 5 wherein the thermal activation occurs from about 180° F. to about 320° F.

7. The method of claim 1 wherein the crosslinkable polymer system is present in an amount of from about 35% to about 90% by volume.

8. The method of claim 1 wherein the filler has a pH of from about 3 to about 10.

9. The method of claim 1 wherein the filler comprises a material selected from the group consisting of a hydratable polymer, an organophilic clay, a water-swellable clay, and combinations thereof.

10. The method of claim 1 wherein the filler has a specific gravity of from less than about 1 to about 5.

11. The method of claim 1 wherein the filler is present in an amount of from about 8% to about 40% by volume.

12. The method of claim 1 wherein the packing agent comprises a material selected from the group consisting of resilient material, a fibrous material, a flaky material, a granular material, and combinations thereof.

13. The method of claim 1 wherein the packing agent is present in an amount of from about 1% to about 10% by volume.

14. The method of claim 1 wherein the second wellbore servicing fluid is placed as a single stream into the subterranean formation.

15. The method of claim 1 wherein the packing agent comprises a material selected from the group consisting of resin-coated ground marble, resin-coated limestone, resin-coated sand, and combinations thereof.

16. The method of claim 1 wherein the packing agent comprises resin coated sand having a particle size in the range of from about 10 to about 70 mesh.

17. The method of claim 16 wherein the resin coated sand has been coated with a material selected from the group consisting of curable resin, a tackifying agent and mixtures thereof.

18. The method of claim 1 wherein the wellbore servicing fluids are placed in the wellbore through a drill string.

19. The method of claim 1 wherein the filler has a specific gravity from about 1.75 to about 4.

20. The method of claim 1 wherein the filler comprises alkyl quaternary ammonium montmorillonite and wherein the filler is present in an amount of from about 8% to about 40% by volume.

21. The method of claim 1 wherein the filler comprises a material selected from the group consisting of a hydratable polymer, an organophilic clay, a water-swellable clay, and combinations thereof and wherein the filler is present in an amount of from about 8% to about 40% by volume.

22. The method of claim 1 wherein the filler has a specific gravity of from less than about 1 to about 5 and wherein the filler has a pH of from about 3 to about 10.

23. The method of claim 1 wherein the filler has a specific gravity of from less than about 1 to about 5 and wherein the filler has a pH of from about 3 to about 10.

24. A method of blocking a flow of fluid through a lost circulation zone in a subterranean formation comprising:

(a) placing a first composition comprising a packing agent into the lost circulation zone, wherein the packing agent comprises a resin coated particulate;

(b) placing a second composition comprising a crosslinkable polymer system and a filler into the lost circulation zone, wherein the filler comprises a dry mix of an oil-based sealing composition, and wherein the crosslinkable polymer system forms a viscous gel in from about 60 mins to about 300 mins; and (c) allowing the compositions to set into place, wherein the compositions are placed into the lost circulation zone through a drill string.

25. The method of claim 24 wherein the packing agent further comprises a material selected from the group consisting of a resilient material, a fibrous material, a flaky material, a granular material, and combinations thereof.

26. The method of claim 24 wherein the resin coated particulate is selected from the group consisting of resin-coated ground marble, resin-coated limestone, resin-coated sand, and combinations thereof.

27. The method of claim 24 wherein the resin coated particulate comprises resin coated sand having a particle size in the range of from about 10 to about 70 mesh.

28. The method of claim 27 wherein the resin coated sand has been coated with a material selected from the group consisting of a curable resin, a tackifying agent and mixtures thereof.

29. The method of claim 24 wherein the filler has a pH of from about 3 to about 10.

30. The method of claim 24 wherein the filler comprises a material selected from the group consisting of a hydratable polymer, an organophilic clay, a water-swellable clay, and combinations thereof.

31. The method of claim 24 wherein the filler has a specific gravity of from less than about 1 to about 5.

32. The method of claim 24 wherein the filler has a specific gravity from about 1.75 to about 4.

33. The method of claim 24 wherein the filler is present in an amount of from about 8% to about 40% by volume.

34. The method of claim 24 wherein the filler comprises alkyl quaternary ammonium montmorillonite and wherein the filler is present in an amount of from about 8% to about 40% by volume.

35. The method of claim 24 wherein the filler comprises a material selected from the group consisting of a hydratable polymer, an organophilic clay, a water-swellable clay, and combinations thereof and wherein the filler is present in an amount of from about 8% to about 40% by volume.

* * * * *